C. W. KINTER AND G. Z. SMITH.
SWITCHING VALVE.
APPLICATION FILED FEB. 14, 1919.

1,394,738.

Patented Oct. 25, 1921.

WITNESSES
L. B. Wood
A. L. Dunlap

INVENTORS
C. W. Kinter
George Z. Smith
By W. E. Dunlap
Att'y.

UNITED STATES PATENT OFFICE.

CHARLES WILLIS KINTER, OF WELLSBURG, AND GEORGE Z. SMITH, OF FOLLANSBEE, WEST VIRGINIA, ASSIGNORS TO FULLER-LEHIGH COMPANY, OF FULLERTON, PENNSYLVANIA, A CORPORATION OF PENNSYLVANIA.

SWITCHING-VALVE.

1,394,738. Specification of Letters Patent. Patented Oct. 25, 1921.

Application filed February 14, 1919. Serial No. 276,953.

*To all whom it may concern:*

Be it known that we, CHARLES WILLIS KINTER and GEORGE Z. SMITH, citizens of the United States of America, the former a resident of Wellsburg, county of Brooke, and State of West Virginia, and the latter a resident of Follansbee, in said county and State, have invented certain new and useful Improvements in Switching-Valves, of which the following is a specification.

This invention relates broadly to valves, and more specifically to a valve which is adapted to be interchangeably employed for closing any one of a plurality of closely associated ports.

The primary object of the invention is to provide a switching valve of the type employed in lines of pipe having branches, the closing member of which is adapted to be interchangeably shifted into closing relation to the main line or to the branch line according to the direction of flow which it is desired that the conducted fluid or material shall take.

A further object is to provide a valve which is designed primarily for use in pipe lines employed for conducting under air pressure powdered or pulverized coal to the various receiving bins of a factory, such lines consisting of a main conducting line and lines branching from said main line at various points and leading to the bins; the movable member of such valve being readily shiftable from a position in which it effectually seals the entrance port to the branch line into like sealing relation to the main line, as when it is desired to discharge the powdered material to a laterally located bin, and vice versa.

A further object is to provide a valve of the character mentioned the closing disk of which, in passing from one operative position to another, is not materially retarded by the conducting pressure or force employed within the line and which in moving to a switched position effectually removes collected material from the seat which it is to occupy, thus providing for effectual sealing of the port closed thereby.

With these and other important objects in view, all of which will hereinafter be made apparent, the invention resides in the features of construction, arrangement of parts and combinations of elements which will hereinafter be fully described, reference being had to the accompanying drawings, in which—

Referring to said drawings, in which like designating characters distinguish like parts throughout the several views—

Figure 1:
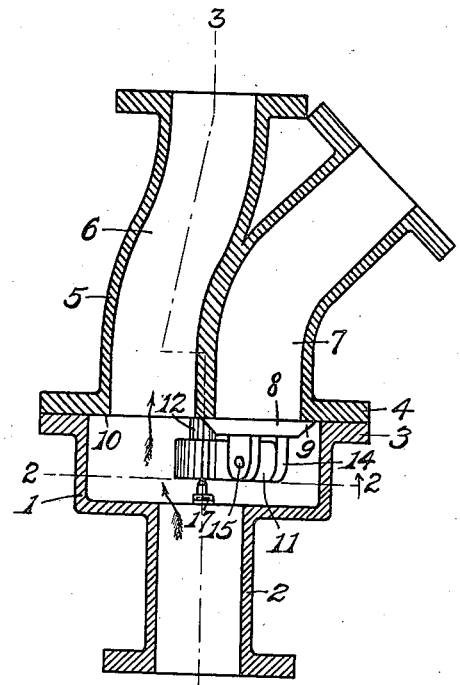
Figure 1 is a longitudinal section of the invention.

1 indicates a housing the interior of which constitutes a valve chamber, said housing being of cylindrical or other appropriate form in cross section having a tubular arm 2 leading axially therefrom at one end adapted to be coupled in the main conducting line of pipe. The opposite end of said housing is open and provided with an external annular flange 3 adapted for attachment by means of bolts or rivets (not shown) to a corresponding flange 4 carried by a casing 5 having twin passages 6 and 7 leading therethrough. The said casing has a part which is of approximately Y-shape and has each of the divergent arms thereof flanged for coupling to an extension of the main line of pipe and to a branch line, said passage 6 being a main line passage and the passage 7 a branch line passage. As shown, the housing 1 is made of such capacity that not only do the inner ends of both of said passages open thereinto, but a sufficient width of shoulder is provided laterally of said ends to afford spacious seats for a valve disk 8 by which either of said passages may be closed.

Figure 3:
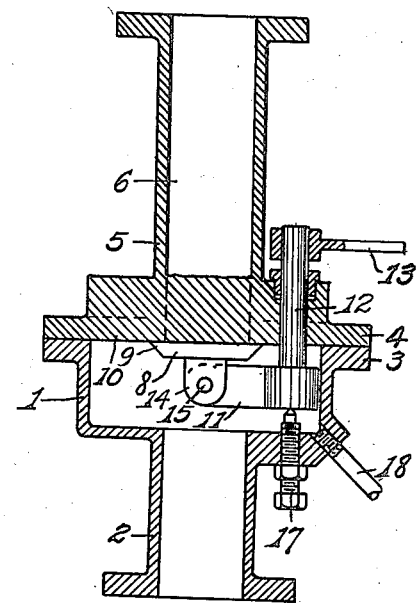
Fig. 3 is a longitudinal section on line 3—3, Fig. 1.
Figure 2:
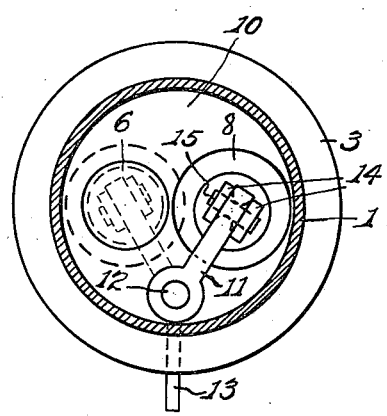
Fig. 2 is a transverse section on line 2—2, Fig. 1.

The disk 8, which is of circular form and has a diameter exceeding that of the passages 6 and 7, is provided with a sharply beveled peripheral edge 9 and has a plain flat face presented toward the casing 5 and adapted to seat closely on the adjacent face of the base 10 of said casing about the entrance to either of said passages. Said disk is pivotally carried by the inner end of an arm 11 which is disposed at right angles to the axis of said disk and which is mounted upon the inner end of a shaft 12 which is rotatably mounted in the base 10 of the casing in an appropriate position located laterally with respect to the Y-shaped portion of the latter, as shown in Figs. 2 and 3. Said shaft has its outer end projected outward from said base 10 and carries thereon an operating lever 13 by means of which it may be rotated for swinging said disk laterally between its operative positions.

Figure 4:
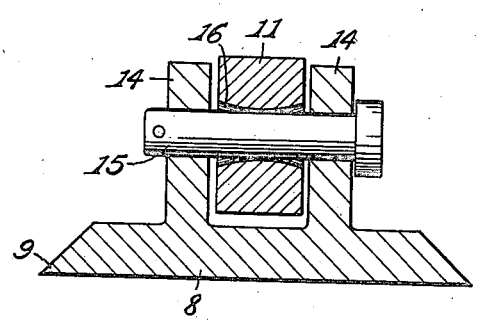
Fig. 4 is an enlarged central section of the valve disk and its supporting arm.

In the preferred construction the disk 8 has formed on its rear face two similar lugs 14 between which the end of the arm 11 is loosely received, as shown in Fig. 4, and to which said arm is connected by a pivot pin 15. The eye 16 provided in said arm for said pin is tapered inwardly from its opposite ends, as shown in said Fig. 4, so that there is assured sufficient lateral play of the disk upon said arm to at all times permit said disk to accommodate itself to the seat upon which it is to rest. Thus, the disk has substantially the freedom afforded by a universal joint, since it may obviously rock both laterally and longitudinally with respect to its supporting arm.

To provide for at all times maintaining a close seating relation between the disk and the base 10 of the casing, a set screw 17 is directed through a wall of the housing 1 in axial alinement with the shaft 12 and has its point impinging upon the inner end of the latter, as shown in Fig. 3.

To provide means whereby the interior of the housing may be kept practically free from particles of the powdered coal which might otherwise collect therein and prove detrimental to free movement of the disk, and also whereby the passage of powdered coal through the valve chamber is facilitated or "boosted", a relatively small air pipe 18 may be located to direct a jet of air under pressure into said chamber in the general direction of the flow of the coal, as shown in Fig. 3.

In practice, when the disk is shifted from one operative position to the other the sharply beveled edge 9 thereof serves to cut or scrape adhering particles of coal from that portion of the face of the base 10 over which it travels and, consequently, to prepare for said disk a clean seat upon which it may firmly rest, effectually sealing the entrance to the passage which it guards.

What is claimed is—

1. In a valve structure, a member provided with a valve seat and a plurality of outlets, a disk valve, a pivot pin carried by the disk valve and extending in a plane approximately parallel to the plane of the disk valve, an arm having an eye receiving the pin, the eye having its opposite ends flared outwardly to allow the pin and thereby the valve to have rocking movement relative to the arm, a shaft to support the arm to allow the latter to oscillate substantially parallel to the plane of the valve, means to operate the shaft to open or close a selected outlet, said valve having its periphery beveled to a knife edge so as to have a shearing action on the valve seat and to cut through any matter adhering to the seat, and a set screw impinged against the shaft to adjustably hold the valve to its seat.

2. In a switching valve for feeding powdered coal, a member provided with a valve seat and a plurality of outlets, a flat disk valve, an arm extending in a plane approximately parallel to the plane of the valve, a rotatable shaft extending outwardly from one side of the outer end of the arm, said disk valve being peripherally beveled to form a circular cutting edge to cut through the mass of coal, means to rockingly support the valve from the other end of the arm thereby to allow the valve cutting edge to be adjusted so as to maintain a shearing relation to the valve seat, adjustable means engaged with the inner end of the shaft to regulate the degree of contact of the valve with its seat so as to maintain said shearing relation, and means to rotate the shaft.

3. In a valve structure, a member provided with a valve seat and a plurality of outlets, a disk valve, an arm, a pin extending transversely of the arm and approximately parallel to the plane of the valve, an eye borne by the arm and receiving the pin, the eye and pin being formed to allow relative rocking movement therebetween, means to mount the arm for oscillating movement, means to operate the arm to move the valve to cover or uncover a selected outlet, and means to adjust the mounting means to regulate the degree of contact of the valve with its seat.

4. In a switching valve for feeding powdered coal, a casing provided with a flat valve seat surrounding a plurality of outlets, a disk valve having a flat face slidable on the seat for the selective opening and closing of the outlets, the edge of said disk valve being beveled outwardly toward the seat to form a circular shearing edge engageable with the seat, and to cut through the mass of coal, and means for moving the disk valve.

In testimony whereof we affix our signatures in presence of two witnesses.

CHARLES WILLIS KINTER.
GEORGE Z. SMITH.

Witnesses:
  JAS. E. PARKER,
  CLAUDE STRATFORD.